US009294298B2

(12) United States Patent
Lee et al.

(10) Patent No.: US 9,294,298 B2
(45) Date of Patent: Mar. 22, 2016

(54) NETWORK SYSTEM AND METHOD OF CONTROLLING NETWORK SYSTEM

(75) Inventors: Koonseok Lee, Seoul (KR); Hoonbong Lee, Seoul (KR); Yanghwan Kim, Seoul (KR)

(73) Assignee: LG Electronics Inc., Seoul (KR)

(*) Notice: Subject to any disclaimer, the term of this patent is extended or adjusted under 35 U.S.C. 154(b) by 294 days.

(21) Appl. No.: 13/516,492

(22) PCT Filed: Nov. 26, 2010

(86) PCT No.: PCT/KR2010/008434
§ 371 (c)(1),
(2), (4) Date: Jun. 15, 2012

(87) PCT Pub. No.: WO2011/074800
PCT Pub. Date: Jun. 23, 2011

(65) Prior Publication Data
US 2012/0271471 A1    Oct. 25, 2012

(30) Foreign Application Priority Data

Dec. 17, 2009  (KR) .................. 10-2009-0126362
Dec. 17, 2009  (KR) .................. 10-2009-0126375

(51) Int. Cl.
*G05D 7/00* (2006.01)
*H04L 12/28* (2006.01)
*H04L 12/26* (2006.01)

(52) U.S. Cl.
CPC ........ *H04L 12/2825* (2013.01); *H04L 43/0817* (2013.01)

(58) Field of Classification Search
CPC .................. H04L 12/2825; H04L 43/0817
USPC ....................................... 700/282
See application file for complete search history.

(56) References Cited

U.S. PATENT DOCUMENTS 4,646,320 A * 2/1987 Krishnan ............... 375/222
4,829,560 A * 5/1989 Evanyk et al. ........ 379/106.11
(Continued)

FOREIGN PATENT DOCUMENTS

CN   1371541 A   9/2002
CN   1656661 A   8/2005
(Continued)

OTHER PUBLICATIONS

Ryu, "Home Network: Road to Ubiquitous World", LG Electronics Power Point Presentation, 20026, 18 pages.*
(Continued)

*Primary Examiner* — Robert Fennema
*Assistant Examiner* — Thomas Stevens
(74) *Attorney, Agent, or Firm* — Dentons US LLP

(57) ABSTRACT

A method of controlling a network system is provided. The network system includes a metering device measuring energy supplied from a power supply source, a communication device in which energy information related to the energy communicates, and an energy management device recognizing the energy information, the energy management device controlling an operation of an electric product. The metering device or the energy management device checks whether communication of the communication device is possible. Also, when it is determined that the communication device is in a communication failure state, the communication failure state is displayed on the outside thereof. When a communication modem mounted on the electric product is in a communication failure state, the electric product may normally perform a power management program, based on power or operation information stored therein.

11 Claims, 9 Drawing Sheets

(56) References Cited

U.S. PATENT DOCUMENTS

| | | | |
|---|---|---|---|
| 5,285,375 A * | 2/1994 | Kim | 700/1 |
| 5,410,471 A * | 4/1995 | Alyfuku et al. | 600/300 |
| 5,436,510 A | 7/1995 | Gilbert | |
| 5,544,036 A * | 8/1996 | Brown et al. | 340/12.52 |
| 5,553,094 A * | 9/1996 | Johnson et al. | 375/130 |
| 5,706,191 A * | 1/1998 | Bassett et al. | 700/9 |
| 5,801,940 A * | 9/1998 | Russ et al. | 700/9 |
| 5,924,486 A | 7/1999 | Ehlers et al. | |
| 6,230,325 B1 * | 5/2001 | Iinuma et al. | 725/110 |
| 6,487,509 B1 | 11/2002 | Aisa | |
| 6,633,823 B2 * | 10/2003 | Bartone et al. | 702/57 |
| 6,980,826 B2 * | 12/2005 | Yamaguchi | 455/556.1 |
| 7,203,736 B1 * | 4/2007 | Burnett et al. | 709/219 |
| 7,379,791 B2 * | 5/2008 | Tamarkin et al. | 700/286 |
| 7,469,288 B2 * | 12/2008 | Tuttle | 709/224 |
| 7,499,978 B2 * | 3/2009 | Kim | 709/208 |
| 7,813,822 B1 * | 10/2010 | Hoffberg | 700/94 |
| 8,024,073 B2 * | 9/2011 | Imes et al. | 700/276 |
| 8,165,724 B2 * | 4/2012 | Kerofsky | 700/291 |
| 2001/0048030 A1 * | 12/2001 | Sharood et al. | 236/49.3 |
| 2002/0011072 A1 * | 1/2002 | Hiraoka et al. | 62/126 |
| 2002/0024332 A1 * | 2/2002 | Gardner | 324/103 R |
| 2002/0032491 A1 * | 3/2002 | Imamura et al. | 700/79 |
| 2002/0082924 A1 * | 6/2002 | Koether | 705/15 |
| 2002/0103655 A1 * | 8/2002 | Boies et al. | 705/1 |
| 2002/0128728 A1 * | 9/2002 | Murakami et al. | 700/10 |
| 2003/0080116 A1 * | 5/2003 | Williamson | 219/719 |
| 2003/0083770 A1 * | 5/2003 | Williamson | 700/117 |
| 2003/0084047 A1 * | 5/2003 | Williamson | 707/10 |
| 2003/0089832 A1 * | 5/2003 | Gold | 248/454 |
| 2003/0109938 A1 * | 6/2003 | Daum et al. | 700/11 |
| 2003/0178894 A1 * | 9/2003 | Ghent | 307/140 |
| 2003/0209938 A1 * | 11/2003 | Hsia | 301/64.701 |
| 2003/0233201 A1 * | 12/2003 | Horst et al. | 702/62 |
| 2004/0039457 A1 * | 2/2004 | Boldt et al. | 700/11 |
| 2004/0083066 A1 * | 4/2004 | Hayes et al. | 702/62 |
| 2004/0111496 A1 * | 6/2004 | Han et al. | 709/220 |
| 2004/0138981 A1 | 7/2004 | Ehlers et al. | |
| 2005/0111560 A1 * | 5/2005 | Haines | 375/257 |
| 2005/0184852 A1 | 8/2005 | Lee | |
| 2006/0017324 A1 * | 1/2006 | Pace et al. | 307/3 |
| 2006/0095164 A1 * | 5/2006 | Donnelly et al. | 700/295 |
| 2006/0154692 A1 * | 7/2006 | Ikehara et al. | 455/556.2 |
| 2006/0168190 A1 * | 7/2006 | Johan et al. | 709/224 |
| 2007/0176789 A1 * | 8/2007 | Kim | 340/870.02 |
| 2007/0220907 A1 * | 9/2007 | Ehlers | 62/126 |
| 2007/0273548 A1 * | 11/2007 | No et al. | 340/870.01 |
| 2008/0125912 A1 * | 5/2008 | Heilman et al. | 700/275 |
| 2009/0013210 A1 * | 1/2009 | McIntosh et al. | 714/4 |
| 2009/0070447 A1 * | 3/2009 | Jubinville et al. | 709/223 |
| 2009/0088907 A1 | 4/2009 | Lewis et al. | |
| 2009/0100492 A1 * | 4/2009 | Hicks et al. | 725/127 |
| 2009/0240380 A1 | 9/2009 | Shah et al. | |
| 2009/0278708 A1 * | 11/2009 | Kelley et al. | 340/870.39 |
| 2010/0057387 A1 * | 3/2010 | Kagan et al. | 702/62 |
| 2010/0217651 A1 | 8/2010 | Crabtree et al. | |
| 2010/0235008 A1 * | 9/2010 | Forbes et al. | 700/291 |
| 2010/0321587 A1 * | 12/2010 | Kerofsky | 348/730 |
| 2012/0198274 A1 * | 8/2012 | Cho et al. | 714/15 |
| 2013/0332000 A1 * | 12/2013 | Imes et al. | 700/291 |

FOREIGN PATENT DOCUMENTS

| | | |
|---|---|---|
| CN | 1661976 A | 8/2005 |
| EP | 1589698 A1 | 7/2004 |
| EP | 2335125 A2 | 6/2011 |
| JP | 11295358 A | 10/1999 |
| KR | 1020040006795 A | 1/2004 |
| KR | 1020070085197 A | 8/2007 |
| WO | 2010031027 A2 | 3/2010 |

OTHER PUBLICATIONS

Han et al., "Remote-Controllable and Energy-Saving Room Architechture based on ZigBee Communication" IEEE, Feb. 2009, pp. 264-268.*

Lien et al., "Remote-Controllable Power Outlet System for Home Power Management" IEEE, 2007, pp. 1634-1641.*

* cited by examiner

NETWORK SYSTEM AND METHOD OF CONTROLLING NETWORK SYSTEM

This application claims the benefit of priority of PCT Application No. PCT/KR2010/008434 filed on Nov. 26, 2010 which claims the benefit of priority of Korean Application No. 10-2009-0126375 filed on Dec. 17, 2009 and Korean Application No. 10-2009-0126362 filed on Dec. 17, 2009, all of which are incorporated by reference in their entirety herein.

TECHNICAL FIELD

The present disclosure relates to a network system and a method of controlling the network system.

BACKGROUND ART

In general, power for operating electric products such as electric home appliances or office equipment is supplied through a power plant, a power transmission line, and a power distribution line.

Such power is supplied from a central power source, not a distributed power source, so that the power spreads in a radial shape from the center to the periphery, which is supplier-centered rather than consumer-centered.

In addition, the supplying of the power is analog and electromechanical, and damage due to an accident is manually undone, and related facilities are manually recovered.

The information about electricity charge can be known only through a power exchange, and thus, it is difficult to know the information about electricity charge in real time. In addition, since a pricing system is substantially fixed, it is difficult to provide incentives for consumers by using price variations.

To address these limitations and improve the efficiency of energy, researches are being actively carried out on a power network, which can realize a flexible power control. The power control may include a consumption reaction control or an intelligent power control.

As described above, the current power network is vertical and centralized network that is controlled by a supplier, but the consumption reaction control or the intelligent power control is a cooperative and distributed network that allows for interaction between suppliers and consumers.

When the flexible power control is realized, for power consumers such as a house or a building, it is needed that a separate electric product and a network connected to a plurality of electric products communicate with a power supply source through a two-way communication for power information, instead of just receiving power. Also, devices for the two-way communication are needed.

DISCLOSURE OF INVENTION

Technical Problem

Embodiments provide a network system in which an electric product may execute a power management program for reducing an electricity charge or power consumption by oneself and stores information related to the execution therein when a communication modem detachably disposed on the electric product is in a communication failure state.

Embodiments also provide a network system in which operation information, which is stored in the electric product when a communication modem is in a communication failure state is transmitted to the outside when communication of the communication modem is possible to use the information at the outside.

Solution to Problem

In one embodiment, a network system includes: a metering device measuring energy supplied from a power supply source; a communication device in which energy information related to the energy communicates; and an energy management device recognizing the energy information, the energy management device controlling an operation of an electric product, wherein the metering device or the energy management device checks whether communication of the communication device is possible, and when it is determined that the communication device is in a communication failure state, the communication failure state is displayed on the outside thereof.

In another embodiment, a network system includes: a communication modem in which energy information related to energy supplied from a power supply source communicates, the communication modem being coupled to an electric product; an energy management device recognizing the energy information, the energy management device controlling an operation of the electric product; and a program operator communicably connected to the energy management device, the program operator providing a power management program for performing a saving operation of the electric product, wherein, when it is recognized that the communication modem is in a communication failure state, the operation of the electric product is controlled based on previously stored energy information or previously stored operation information of the electric product.

In further another embodiment, a method of controlling a network system a communication modem in which energy information related to energy supplied from a power supply source communicates, the communication modem being coupled to an electric product and an energy management device controlling an operation of the electric product, based on the energy information includes: determining whether communication of the communication device is possible; and controlling an operation of the electric product, based on energy information previously stored in the electric product or the energy management device or the operation information of the electric product when it is recognized that the communication modem is in a communication failure stat.

The details of one or more embodiments are set forth in the accompanying drawings and the description below. Other features will be apparent from the description and drawings, and from the claims.

Advantageous Effects of Invention

According to the present disclosure including the above-described components, when the communication modem mounted on the electric product is in the communication failure state, the electric product may normally execute the power management program based on the power and operation information stored therein.

Thus, even though the communication modem is in a state of emergency such as the communication failure, the power management program may be executed through the electric product connected to the corresponding communication modem to reduce the electricity charge, the power consumption, or the carbon emission amount.

Also, the communication modem may be amounted on the electric product without a significant design change with respect to the structure of the electric product. Thus, the electric product may be effectively operated on the network system to save the electricity charge and the power consumption.

Also, when the communication modem is in the communication failure state, the operation information, the additional operation information, or the power information of the electric product may be transmitted to the outside when the communication of the communication modem is possible.

Since the operation information of the electric product is transmitted to the energy management system or the metering device, and the transmitted operation information is transmitted to the power management program operator, the operation information of the electric product may be easily grasped event though the communication modem is in the communication failure state.

MODE FOR THE INVENTION

Figure 1:
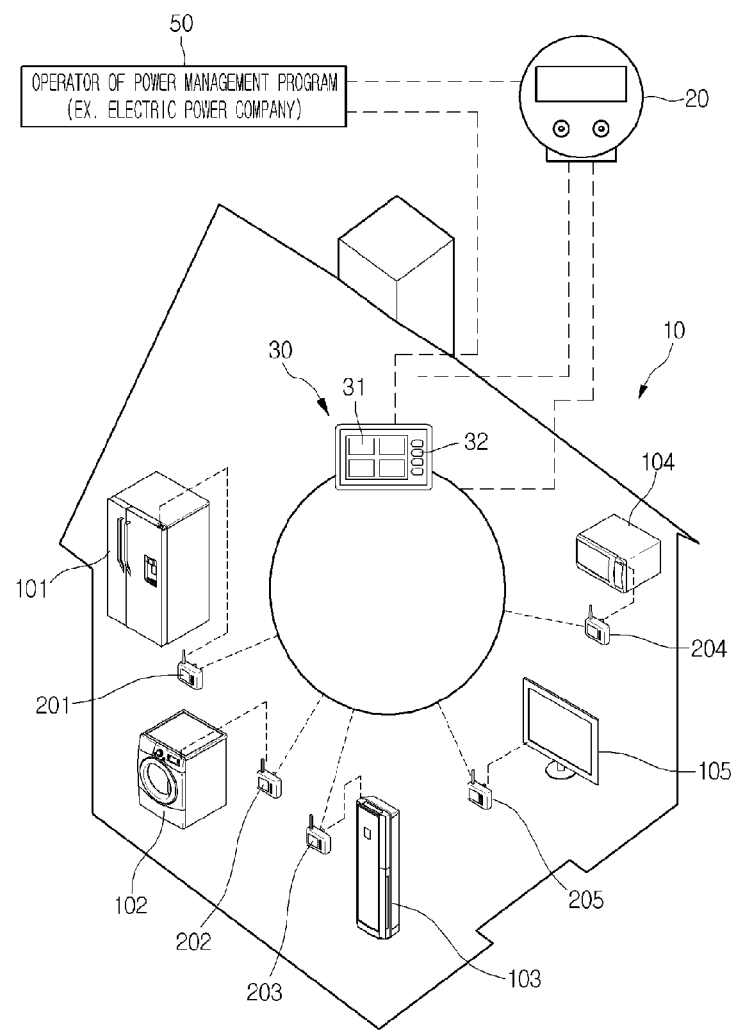
FIG. 1 is a schematic view of a power management network according to an embodiment.

Reference will now be made in detail to the embodiments of the present disclosure, examples of which are illustrated in the accompanying drawings. The invention may, however, should not be construed as being limited to the embodiments set forth herein; rather, that alternate embodiments included in other retrogressive inventions or falling within the spirit and scope of the present disclosure will fully convey the concept of the invention to those skilled in the art.

All terms used herein have the same meanings as general terms understood by those of ordinary skill in the art. If the terms used herein collide with the general terms, the terms used herein take priority over the general terms. While the present disclosure has been particularly shown and described with reference to exemplary embodiments thereof, it will be understood by those of ordinary skill in the art that various changes in form and details may be made therein without departing from the spirit and scope of the present disclosure as defined by the following claims. Like reference numerals refer to like elements throughout.

FIG. 1 is a schematic view of a power management network according to an embodiment.

The power management network includes a metering device (smart meter) 20 which can measure power supplied to a residential customer and the electricity charge of the power in real time and an energy management system (EMS) 30 connected to the metering device (smart meter) 20 and a plurality of electric products such as home appliances for controlling the electric products.

Here, the electricity charge is measured based on price for each time. The price for each time is expensive in a time period where power consumption increases steeply and inexpensive in a time period such as midnight where a relatively small amount of power is consumed.

The power management network 10 is operated by a power management program made to efficiently mange electricity charges and power consumption in the residential customer according to time-varying electricity costs.

For executing the power management program, the EMS 30 and the metering device (smart meter) 20 communicates with an operator 50 of the power management program, such as an electric power company.

Here, the EMS 30 may be provided in the form of a terminal, which includes a screen 31 to display the current power consumption state and external environments (temperature, humidity) and an input unit 32 to receive user s manipulations.

The EMS 30 and the metering device (smart meter) 20 are selectively or simultaneously connected to the electric products such as a refrigerator 101, a washing or drying machine 102, an air conditioner 103, a TV 105, and a cooking device 104 through an in-house power management network.

Communication modems 200 (201 to 205) are detachably provided to the electric products as a communication device for wireless communication with the EMS 30 and the metering device (smart meter) 20. The communication modems 200 may be coupled to the outsides of the electric products for each attachment and detachment. Also, for the detachment of the communication modem 200, a slot or port may be provided in each of the electric products.

The communication modems 200 are operated according to ZigBee (wireless communication method) for communications such as one-to-one, one-to-many, and manyto-many communications. However, the communication method of the communication modems 200 is not limited to ZigBee. Other wireless communication methods may be used.

Therefore, power information or operation information of the electric products connected to the communication modems 200 may be transmitted to the EMS 30 or the metering device (smart meter) 20 through the communication modems 200, and the information may be transmitted in the opposite direction.

Figure 2:
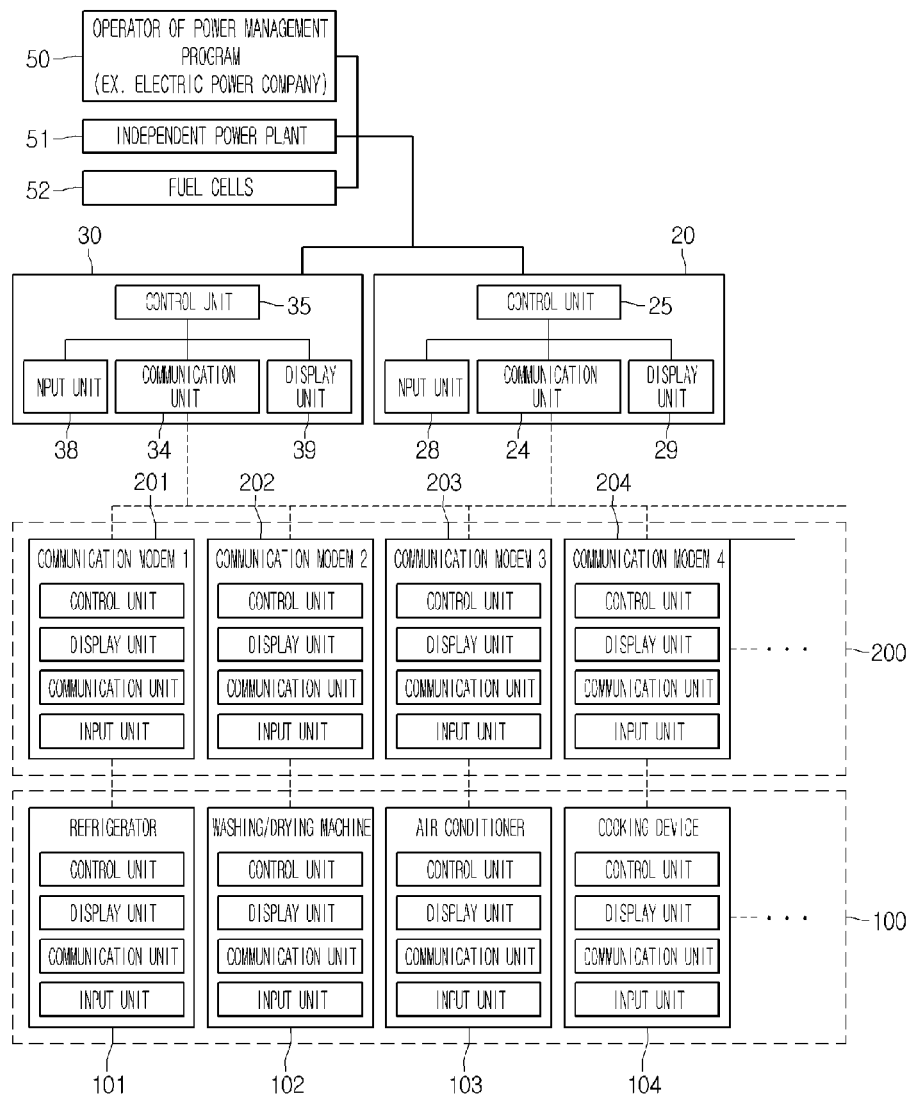
FIG. 2 is a control block diagram of the power management network according to an embodiment.
Figure 3:
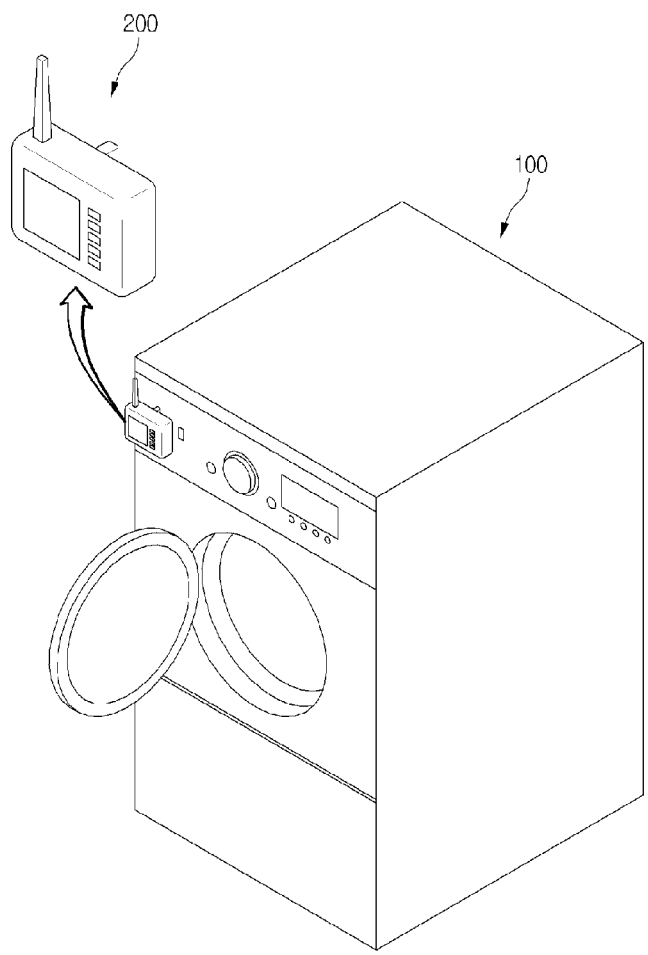
FIG. 3 is a control block diagram of a communication modem and an electric product according to an embodiment.

FIG. 2 is a control block diagram of a state in which each component is connected to the power management network according to an embodiment.

Referring to FIG. 2, a power management program operator 50 may be an electric power company having a general power generation plant (e.g., thermal power, nuclear power, and water power generation plants) or a power generation plant using renewable energy sources (e.g., solar light, wind power, and geothermal power) as a power supply source. However, the power management program operator 50 is not limited thereto.

In addition, the power management network 10 may include an independent power plant 51 such as a solar power generation plant of a residential customer or office and fuel cells 52 of a fuel cell vehicle or a residential customer as other power supply sources. Such power supply sources and the power management program operator 50 may be connected to the metering device (smart meter) 20 and the EMS 30.

In addition, the metering device (smart meter) 20 and the EMS 30 may communicate with the electric products through the communication modems 200.

The metering device (smart meter) 20 may include a first control unit 25, a first input unit 28, a first communication unit 24, and a first display unit 29. The EMS 30 may include a second control unit 35, a second input unit 38, a second communication unit 34, and a second display unit 39.

The communication units 34 and 24 communicate with the communication modems 200 (201 to 204) of the in-house electric products 100 such as the refrigerator 101, the washing or drying machine 102, the air conditioner 103, and the cooking device 104 to transmit and receive power information and operation information.

In at least one of the EMS 30 and the metering device (smart meter) 20, the control units 25 and 35 check information in real time, such as setting information input by a user through the input unit 28 or 38, existing accumulated operation and power consumption history information of the electric products 100, and external power supply information. Also, the EMS 30 or the metering device (smart meter) 20 processes such information to control operations of the electric products and power supplied to the electric products.

The display units 29 and 39 display power information supplied from the power supply sources or operation and power information of the electric products, and communication states of the electric products 100.

The EMS 30 or the metering device (smart meter) 20 controls operations of the electric products so that the electric products perform a saving mode, for example, an electricity charge saving mode for saving electricity charges (energy charges) of the electric products or an energy saving operation mode for reducing power consumption. The electricity charge saving mode may be performed, based on information with respect to electricity rates changed in real time according to operation times of the electric products.

The EMS 30 or the metering device (smart meter) 20 controls the electric products in consideration of a peak time period in which electricity charge is the most expensive in a day, or in consideration of an upper limit of power consumption or electricity charge.

The electricity charge saving mode is controlled based on the peak time period or the upper limit of the power consumption. Also, the electric products may be jointed to the power management program provided by the electric power company to effectively perform a saving operation (e.g., energy saving operation and electricity charge saving operation).

If electric power is managed by joining the power management program, electricity charge may be saved, and moreover other effects may be attained such as getting a benefit of electricity charge reducing policies.

The communication modems 200 (201 to 204) may include control units, display units, communication units, and input units. Thus, the communication modems 201 to 204 may display current communication states and receive user s inputs.

The communication modems 200 are connected to the EMS 30 or the metering device (smart meter) 20 for communication and transmit commands according to the power management program to the electric products 100. Thus, the electric products 100 may be controlled according to the power management program.

In addition, the control units of the communication modems 200 may be configured to control the electric products 100 according to time-varying electricity rates, an upper limit of electricity charge, or an upper limit of power consumption. That is, the electric products 100 may operate in power-saving operation mode such as the electricity charge saving mode or the energy-saving operation mode under self control conditions using the communication modems 200.

Each of the electric products 100 may include a display unit and a control unit. The display unit may display an operation state of the electric product 100 and a communication state of the communication modem 200 of the corresponding electric product 100.

Therefore, a user may easily check communication states (whether communication therebetween is possible) of the communication modems 200 through at least one of the EMS 30, the metering device (smart meter) 20, the communication modems 200, and the electric products 100. If any one of the communication modems 200 is abnormal, the user may reinstall the communication modem 200 on the electric product 100 or replace the communication modem 200.

The past operation information or power consumption information for each time may be stored in the control unit of the electric product 100. The information may be used when the power management program is performed by itself during emergency such as out of communication of the communication modem 200.

The binder 300 includes a control unit 300a, a display unit 300b, a communication unit 300c, and an input unit 300d. Also, the binder 300 grants the home code to a non-registered electric product. The electric product to which the home code is granted may be registered in the power management network 10.

When the electric product is registered in the power management network 10, the electric product may become a component of the power management network in which the power management program provided from the power company is performed. The electric product is operated to reduce an electricity charge, power consumption, or a carbon discharge amount according to a command of the power management program.

The communication unit 300c communicates with a communication unit of a registration object electricity product, and the input unit 300d receives a registration command of the registration object electricity product. Typically, the registration command is entered by manipulating the input unit 300d using a user s hand. Also, the display unit 300b displays information related to the registration, i.e., the home code, a product code, and whether the registration is completed.

The control unit 300a is connected to the display unit 300b, the communication unit 300c, and the input unit 300d. Thus, when an input command for registration occurs, the control unit 300a controls the electric product that is a registration object to output a home code transmission command related to the power management network. Here, the control unit 300a may output a control command for granting a product code, selectively, an identification code as well as the home code.

Figure 4:
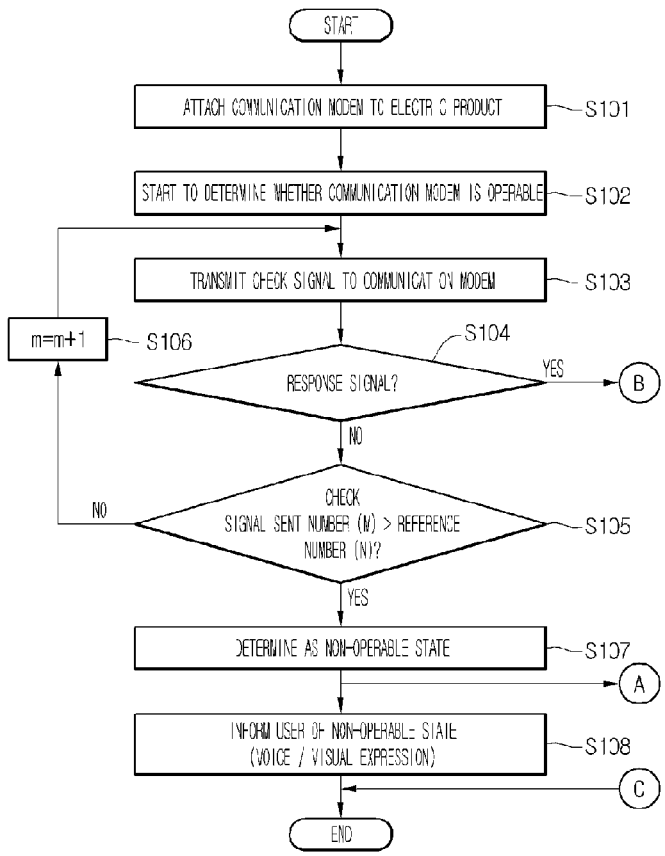
FIGS. 4 and 5 are flowcharts illustrating a control process related to communication failure of a communication modem according to a first embodiment.

As shown in FIG. 4, the communication modem 200 is detachably coupled to the electric product 100. For example, the communication modem 200 is fitted into a coupling part (e.g., port or slot) disposed in the electric product 100.

Since the user easily installs or separates the communication modem 200 on/from the electric product 100, cumbersome procedures such as call of a servicer are not required when the communication modem 200 is connected to the power management network to perform the power management program.

Figure 5:
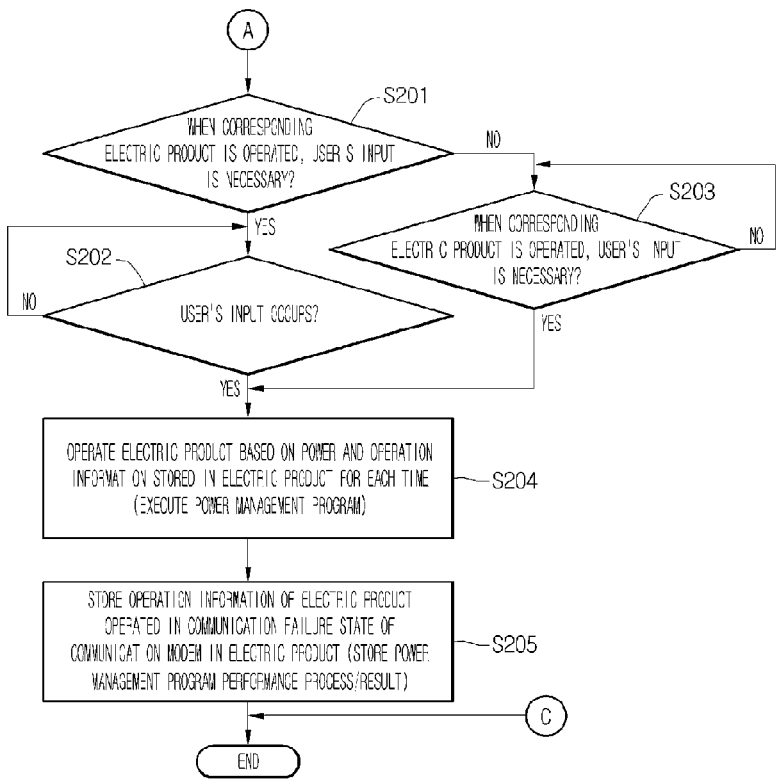

FIGS. 4 and 5 are flowcharts illustrating a method of determining a communication state of the communication mode of the electric product disposed in the power management network, a process of controlling the electric product when communicated is failed, and a process of performing a power program when the communication state is normal.

When the communication modem is mounted on a specific modem in operation S101, it is checked whether the mounting or communication of the communication modem is normal in operation S102. In operation S103, a check signal is transmitted from the EMS, the metering device (smart meter), or a corresponding electric product to the communication modem.

Thereafter, in operation S104, it is determined whether a response signal occurs from the communication modem in response to the transmitted check signal. When no response signal occurs, it is determined whether a transmission number m of the check signal exceeds a predetermined reference number n in operation S105.

This is done for a reason that the check signal is transmitted several times to determine whether the communication is possible it is matter of reliability that the check signal is transmitted one time to determine whether the communication is possible. If the response signal does not occur even though the check signal is transmitted several times, it is determined that the communication is impossible.

When the transmission number m of the check signal does not exceed a predetermined reference number n in a state where the response signal does not occur, the check signal is transmitted one more time in operations S106 and S103. When the transmission number m of the check signal exceeds a predetermined reference number n in a state where no response signal occurs, it is determined that the communication modem is in a communication failure state in operation S107.

In operation S108, the communication failure is displayed on the EMS, the metering device (smart meter), the corresponding electric product, or the communication modem to allow a user to quickly and easily recognize the communication failure of the communication modem connected to a specific electric product. Here, the communication failure may be visibly displayed as well as informed as sound such as alarm.

When the communication modem is in the communication failure state, it is limited that an external unit (component) of the electric product receives information related to an operation of the electric product. However, when the electric product is normally operated, power consumption information and operation information for each time may be stored in a database form in a control unit or a data storage unit of the corresponding electric product.

When the communication modem is in the communication failure state, a process for confirming the stored information of the electric product is performed. In detail, in operation S201, it is determined whether a user input for operating the corresponding electric product is necessary.

For example, in case of electric products (intermittent products) such as a washing machine, dryer, or cooker, generally, a user puts laundry or an object to be cooked into a corresponding electric product to operate the electric product. However, in case of a refrigerator (constant operating product), the electric product is continuously operated without a user separate input.

In case where the corresponding electric product such as the washing machine or the dryer is included in a product group in which an input operation should be essentially performed before it is operated, it is determined whether a user input occurs in operation S202.

When the user input for operating occurs, the corresponding electric product is operated based on power and operation information for each time stored in the corresponding electric product, a metering device, or an energy management device. Here, in operation S204, the operation of the electric product may be substantially equal or similar to that of a power management program provided by a power management program operator to reduce power consumption and charge.

Figure 8:
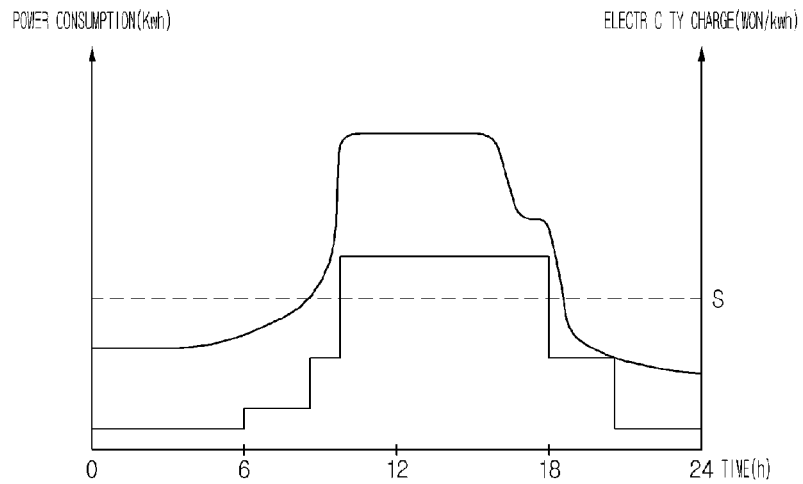
FIG. 8 is a graph of an electricity charge and power consumption depending on a time.

That is, as shown in FIG. 8, when an electric product having an expensive electric charge (energy charge) than a set reference (S), it may prevent the electric product from being used or power consumption of the electric product may be minimized. That is to say, an operation of the electric product may be controlled so that the electric product is operated at a time except a power usage peak time.

Also, it is possible to execute a power management program in which the upper limit value of the power consumption or electricity charge in addition to the control operation in consideration of the peak time period is previously set to follow the upper limit value.

Corresponding to the power management program, a process in which the corresponding electric product is operated itself based on the above-described information and then operation information according to the information is stored in the electric product is performed. That is, in operation S205, the operation information of the electric product is updated and stored in a storage device (e.g., the electric product, the energy management device, or the metering device).

Thereafter, when the communication modem of the electric product is normally operated, the stored operation information may be transmitted into the EMS or the metering device (smart meter). Also, the EMS or the metering device (smart meter) may provide the received operation information into the power management program operator or an electric product manufacturer.

According to the above-described method, the user may confirm a fact in which the power management program is executed even though the communication is failed. Thus, it may give aid to improve the power management program.

In case of the corresponding electric product such as the refrigerator in which the user input is not required, it is determined whether a judgment reference time (e.g., current time) is within a time at which the corresponding electric product is typically operated according to the stored operation information for each time in operation S203.

After the determined result, if the current time is within the typical operation time, a process (power management program performance) in which the electric product is operated based on the power or operation information for each time, which is stored in the corresponding electric product may be performed in operation S204. Also, in operation S205, the operation information of the electric product, which is operated in the communication failure state of the communication modem is stored in the electric product (store the power management program performance process/result)

Figure 6:
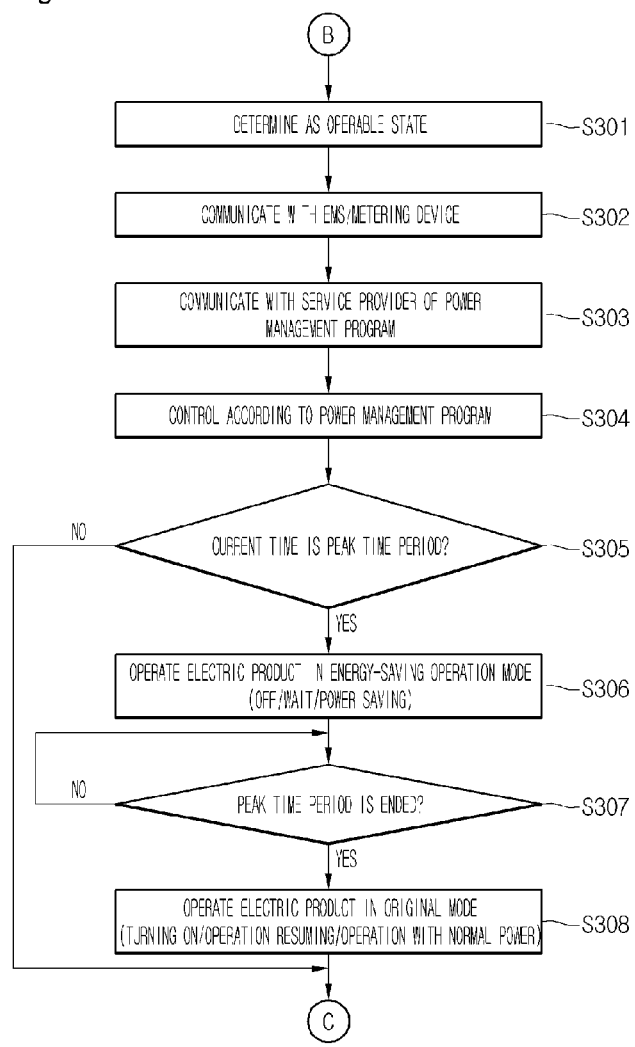
FIG. 6 is a flowchart illustrating a process controlled by a power management program when the communication modem is normally operated according to the first embodiment.

As shown in FIG. 6, when the response signal occurs from the communication modem mounted in the electric product, it is recognized that the communication modem is properly mounted on the electric product and it is determined that the communication modem is in a communicable state in operation S301.

The communication modem may communicate with the EMS or the metering device (smart meter) in operation S302 and communicate with a service provider (operator) of the power management program in operation S303. Also, in operation S304, the recognized communication modem and the electric product may be joined to the power management program, and the electric product may be controlled by the power management program.

As described above, the power management program may be a program in which the power consumption is minimized or the operation of the electric product is stopped at the peak time period to reduce the electricity charge. Also, the power management program may set the upper limit value of the power consumption or a consumption target value of each of the electric products. Then, when the power consumption of the electric product exceeds the set value, the power management program may stop an operation of the corresponding electric product or warn it to the user.

A process for reducing the electricity charge based on the recognition of the peak time period will be described below. When the current time is within the peak time period in operation S305, the electric product is switched from an original set state to an energy-saving operation state. Then, in operation S306, the energy-saving operation is performed. The energy-saving operation may be performed through a process in which the electric product is turned off, the operation of the electric product is temporarily delayed, or the power consumption of the electric product is reduced.

In operation S307, it is determined whether the peak time period is ended. When the peak time period is ended, the electric product returns to the operation of the original set state (e.g., a power-on operation, a re-operation, an original state operation of the power consumption) in operation S308.

The operation of the electric product may be performed by the EMS or the metering device (smart meter) in which the power management program is executed. Also, when the communication modem has the control functions (e.g., a control function for reducing the power consumption in the peak time period and a control function according to the upper limit target value), the operation of the electric product may be performed by the communication modem.

Figure 7:
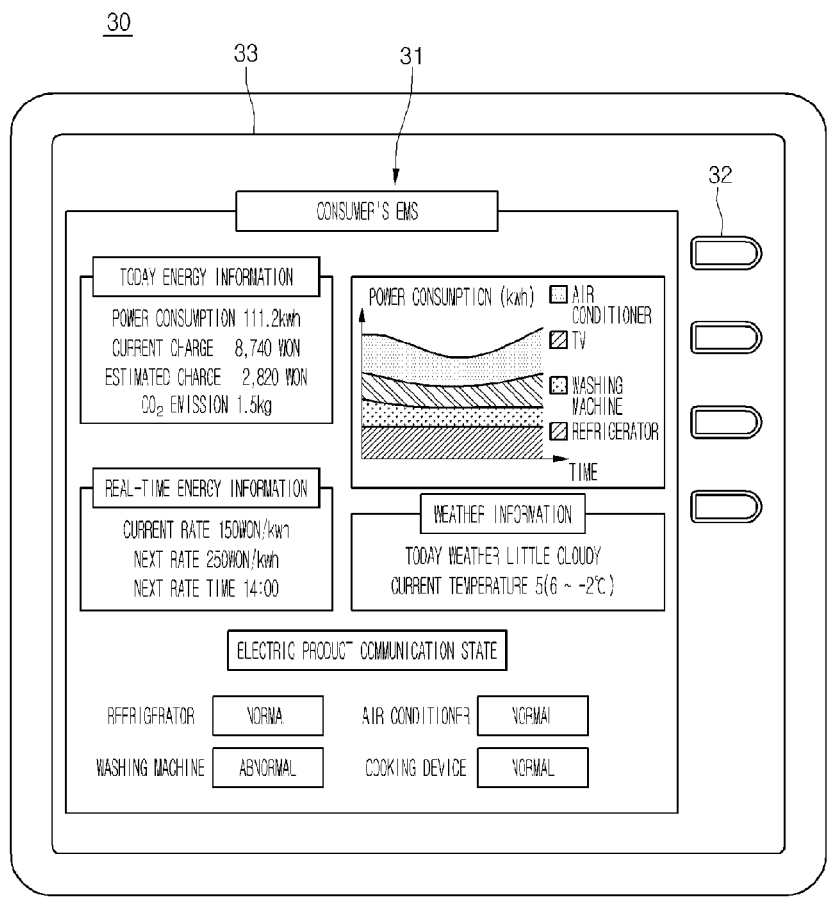
FIG. 7 is a front view of an energy management device according to an embodiment.

As shown in FIG. 7, when the above-described control method is performed, the EMS 30 informs the communication state and real-time energy information of the corresponding electric product and the real-time (or stored) power consumption of each of the electric products to allow the user to easily recognize them.

Also, such information may be displayed on the metering device (smart meter).

As shown in FIG. 8, the electricity charge is the greatest in a time period in which typical power consumption is the greatest. The time period is referred to as the peak time period.

The electricity charge is expensive in the peak time period when compared to a time period except the peak time period. Thus, the electricity is used according to the above-described power management program, the electricity charge may be saved.

Hereinafter, another embodiment will be described. Portions of the present embodiment different from those of the above-described embodiment will be mainly described. Thus, the same portions will be denoted by the same description and reference numeral as those of the previous embodiment.

Figure 9:
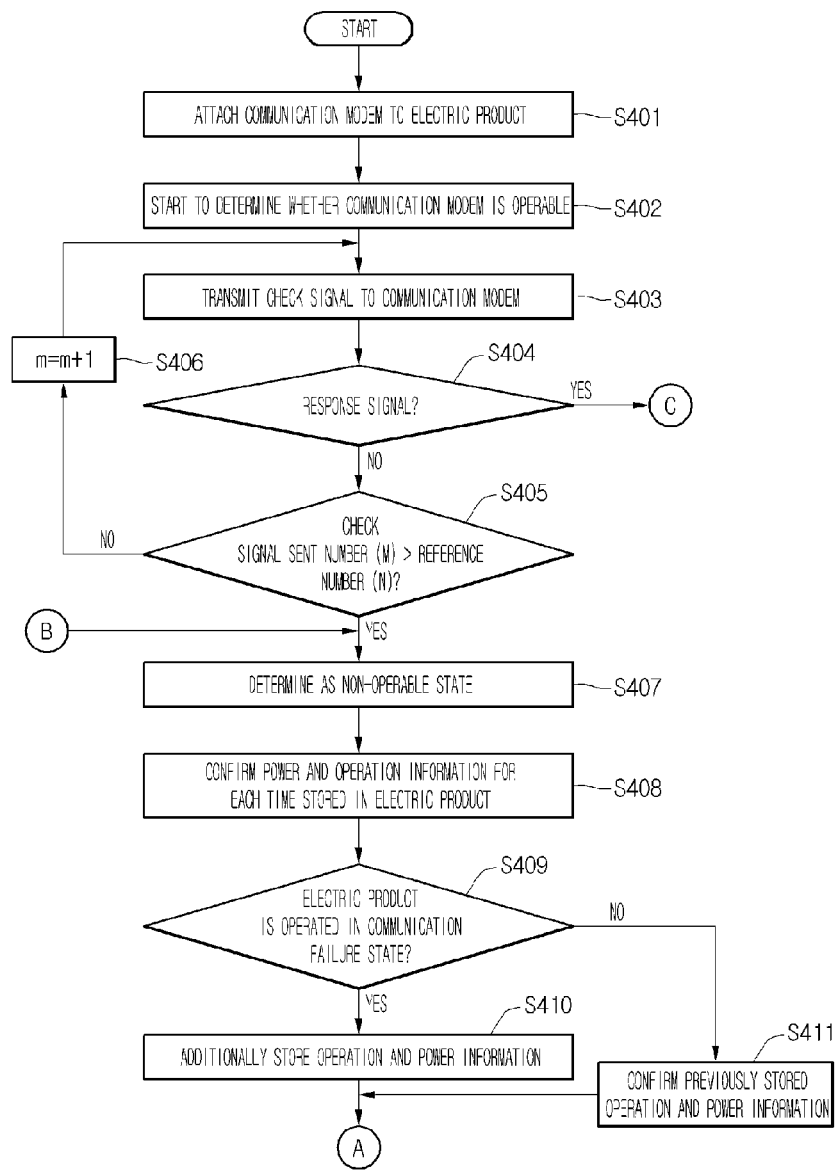
FIGS. 9 and 10 flowcharts illustrating a control process related to communication failure of a communication modem according to a second embodiment.
Figure 10:
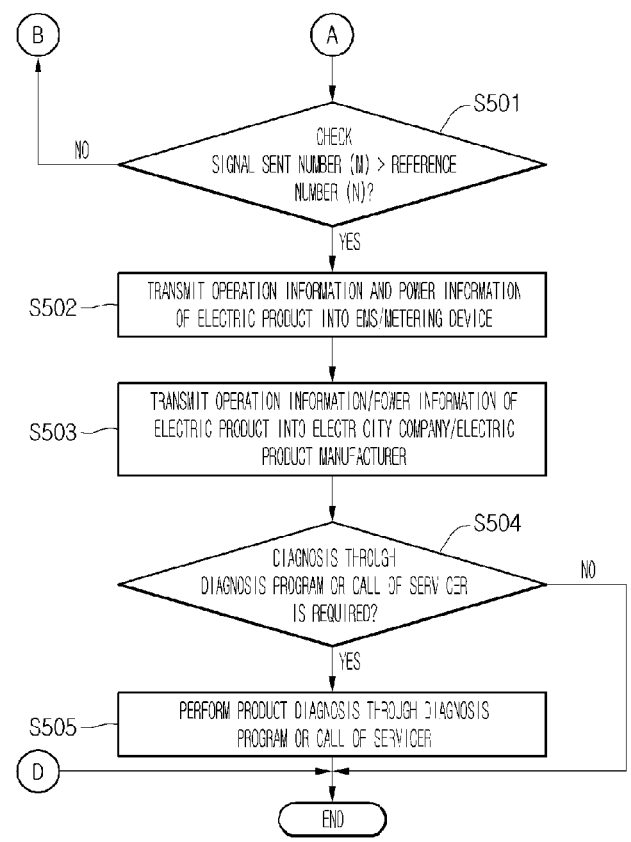

FIGS. 9 and 10 flowcharts illustrating a control process related to communication failure of a communication modem according to a second embodiment.

Referring to FIG. 9, when a communication modem is mounted on a specific modem in operation S401, it is checked whether the mounting or communication of the communication modem is normal in operation S402. In operation S403, a check signal is transmitted from an EMS, a metering device (smart meter), or a corresponding electric product to the communication modem.

Thereafter, in operation S404, it is determined whether a response signal occurs from the communication modem in response to the transmitted check signal. When no response signal occurs, it is determined whether a transmission number m of the check signal exceeds a predetermined reference number n in operation S405.

When the transmission number m of the check signal does not exceed a predetermined reference number n in a state where the response signal does not occur, the check signal is transmitted one more time in operations S406 and S403. When the transmission number m of the check signal exceeds a predetermined reference number n in a state where no response signal occurs, it is determined that the communication modem is in a communication failure state.

In operation S407, the communication failure is displayed on the EMS, the metering device (smart meter), the corresponding electric product, or the communication modem to allow a user to quickly and easily recognize the communication failure of the communication modem connected to a specific electric product. Here, the communication failure may be visibly displayed as well as informed as sound such as alarm.

When the communication modem is in the communication failure state, it is limited that an external unit (component) of the electric product receives information related to an operation of the electric product. However, when the electric product is normally operated, power consumption information and operation information for each time may be stored in a database form in a control unit or a data storage unit of the corresponding electric product.

In operation S408, a process of confirming the stored information is performed. Also, in operation S409, it is determined whether the electric product including the communication modem is normally operated in the communication failure state of the communication modem.

For example, even though the communication of the communication modem is impossible, electric products such as a washing machine and a dryer may be operated by a random operation input of a user. Also, an electric product such as a refrigerator may be automatically operated without a separate input of the user.

If the electric product is operated, operation information and power information (energy information) related to the operation of the electric product may be additionally stored in the electric product in operation S410. If the electric product is not operated, the existing stored operation and power information are confirmed in operation S411.

For example, the power information may relate to a variation of the electricity charge for each time as shown in FIG. 8. The operation information may include an operation state for each time of each of components of the electric product, the power consumption information, or a normal or abnormal operation of each of the components.

Referring to FIG. 10, in operation S501, it is determined whether the communication modem communicates with the EMS or the metering device (smart meter). Here, if the communication modem communicates with the EMS or the metering device (smart meter), the previously or additionally stored operation or power information of the electric product are transmitted into the EMS or the metering device (smart meter) in operation S502.

In operation S503, the EMS or the metering device (smart meter) may transmit the received information into a power management program operator (electricity company) or an electric product manufacturer.

When the user requires diagnosis of an operation state or upgrade state of the electric product through a self-diagnosis program, or requires call of a servicer of the electricity company or the electric product manufacturer in operation S504, the EMS performs the self-diagnosis program through Internet or requires service call of the electricity company or the electric product manufacturer in operation S505.

According to the above-described method, it may be determined whether the communication failure of the communication modem is generated due to a defect of the power management program or a self-defect of the electric product.

Figure 11:
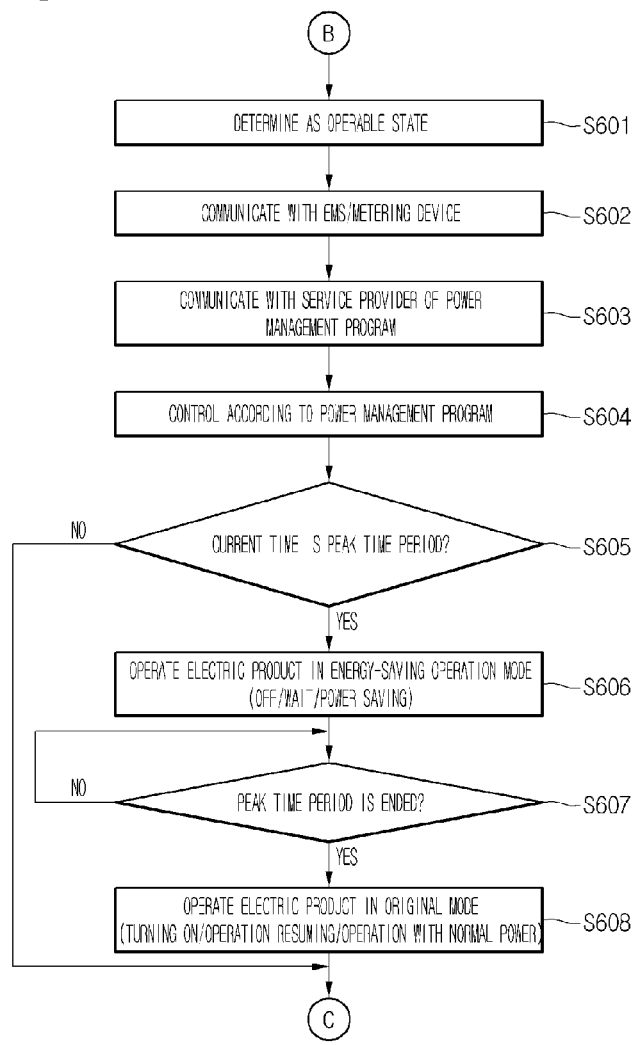
FIG. 11 is a flowchart illustrating a process controlled by a power management program when the communication modem is normally operated according to the second embodiment.

Referring to FIG. 11, when the response signal occurs from the communication modem mounted in the electric product, it is recognized that the communication modem is properly mounted on the electric product and it is determined that the communication modem is in a communicable state in operation S601.

The communication modem may communicate with the EMS or the metering device (smart meter) in operation S602 and communicate with a service provider of the power management program in operation S603.

The communication modem or the electric product may be recognized on the network and joined to the power management program. That is, a predetermined address (code) may be granted to the communication modem or the electric product. In operation S604, the electric product may be controlled by the power management program.

In operation S605, it is determined whether the current time is within the peak time period based on the peak time period. If the current time is within the perk time period, an energy-saving operation of the electric product starts in operation S606. The energy-saving operation may be performed through a process in which the electric product is turned off, the operation of the electric product is temporarily delayed, or the power consumption of the electric product is reduced.

In operation S607, it is determined whether the peak time period is ended. When the peak time period is ended, the electric product returns to the operation of the original set state (e.g., a power-on operation, a re-operation, an original state operation of the power consumption) in operation S608.

The operation (the energy-saving operation or the operation returning to the original state) of the electric product may be performed by the EMS or the metering device (smart meter) in which the power management program is executed. Also, when the communication modem has specific control functions (e.g., a control function for reducing the power consumption in the peak time period and a control function according to the upper limit target value), the operation of the electric product may be performed by the communication modem.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

According to the network system of the present disclosure, when the communication modem mounted on the electric product is in the communication failure state, the electric product may normally execute the power management program based on the power and operation information stored therein. Thus, industrial applicability is significantly high.

The invention claimed is:

1. An electric product for a network system, comprising:
a case having a coupler;
a communication device in which energy information related to energy is received from a source device including an energy management device or a metering device, the communication device coupled to the coupler of the case; and
a controller that controls an operation of an electric product based on the energy information and stores operation information and the energy information during when communication of the communication device with the source device is possible,
wherein the controller checks whether the communication of the communication device with the source device is possible, and when the communication device is in a communication failure state, the controller controls the electric product according to whether the electric product is an intermittent operation product or a constant operation product,
wherein, when the electric product is the intermittent operation product and if the controller recognizes an input of a command from a user for starting operation of the electric product, the controller controls the electric product to operate based upon stored energy information or operation information of the electric product while the communication of the communication device with the source device is possible,
wherein, when the electric product is the constant operation product and if the controller recognizes that current time is within a time period in which the electric product operates based on the stored energy information or operation information of the electric product while the communication of the communication device with the source device is possible, the controller controls the electric product to operate based upon the stored energy information or operation information of the electric product,
wherein the stored energy information and the operation information is updated by the electric product for each time of the operation of the electric product when the electric product operates during the communication failure state, and
wherein the intermittent operation product comprises at least one of a washing machine, a cooking appliance, a dryer, a dish washer, and an air conditioner, and the constant operation product comprises at least one of a refrigerator and a water purifier.

2. The electric product according to claim 1, wherein, when the controller is capable of communicating with a power management operator the controller receives a power-saving operation of the electric product based on a power management program.

3. The electric product according to claim 2, wherein, the controller communicates with the power management operator through the communication device.

4. The electric product according to claim 2, wherein the power management program controls the operation of the electric product so that an operation time period of the electric product avoids a peak time period.

5. The electric product according to claim 2, wherein, when an operation time period is within a peak time period, the operation of the electric product is switched from a set operation mode to an energy-saving operation mode.

6. The electric product according to claim 5, wherein, when the operation of the peak time period is ended, the electric product returns to the set operation mode.

7. A method of controlling a network system, a communication device in which energy information related to energy supplied from a power supply source is received from a source device including an energy management device or a metering device, the communication device coupled to an outer case of an electric product, and a controller controlling an operation of the electric product based on the energy information and storing operation information and the energy information during when communication of the communication device with the source device is possible, the method comprising:

determining whether the communication of the communication device is possible;

controlling the controller for the electric product according to whether the electric product is an intermittent operation product or a constant operation product when the communication device is in a communication failure state, such that the electric product operates based upon stored energy information or the operation information of the electric product while the communication of the communication device with the source device is possible:

in a case when the electric product is the intermittent operation product and if the controller recognizes an input of a command from a user for starting operation of the electric product, or in a case the electric product is the constant operation product and if the controller recognizes that current time is within a time period in which the electric product operates based on the stored energy information or the operation information of the electric product while the communication of the communication device with the source device is possible, wherein the stored energy information and the operation information updated by the electric product for each time of the operation of the electric product when the electric product operates during the communication failure state, and wherein the intermittent operation product comprises at least one of a washing machine, a cooking appliance, a dryer, a dish washer, and an air conditioner, and the constant operation product comprises at least one of a refrigerator and a water purifier.

8. The method according to claim 7, wherein the network system further comprises a power management operator to provide a power management program to the electric product, wherein a control command according to the power management program is transmitted to the electric product through the communication device or the energy management device or the controller.

9. The method according to claim 8, further comprising performing the control command to reduce power consumption or an electricity charge related to the electric product when the communication with the communication device is possible.

10. The method according to claim 9, further comprising storing the energy or operation information of the electric product according to an execution of the power management program.

11. The method according to claim 8, further comprising controlling the operation of the electric product to allow an operation time period of the electric product to avoid a peak time period.

* * * * *